(12) United States Patent
Amtmann (10) Patent No.: US 6,510,149 B1
(45) Date of Patent: Jan. 21, 2003

(54) DATA CARRIER INCLUDING A CIRCUIT WITH TIME SLOT DETERMINATION MEANS AND TIME SLOT FIXATION MEANS

(75) Inventor: Franz Amtmann, Graz (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/325,675

(22) Filed: Jun. 3, 1999

(30) Foreign Application Priority Data

Jun. 5, 1998 (EP) ............................................ 98890171

(51) Int. Cl.[7] ................................................. H04J 3/00
(52) U.S. Cl. ........................ 370/345; 370/342; 370/337; 370/347; 379/116
(58) Field of Search .................... ; 340/825.35; 370/79, 370/85.1, 463, 458, 345, 342, 337, 347; 379/116; G06K 7/00

(56) References Cited

U.S. PATENT DOCUMENTS

| 4,916,692 | A | * | 4/1990 | Clarke | 370/85.1 |
| 5,539,394 | A | * | 7/1996 | Cato | 340/825.54 |
| 5,594,738 | A | * | 1/1997 | Crisler | 370/347 |
| 5,995,602 | A | * | 11/1999 | Johnson | 379/116 |
| 6,188,699 | B1 | * | 2/2001 | Lang | 370/463 |

FOREIGN PATENT DOCUMENTS

EP 0 777 191 * 4/1997 ............ G06K/7/00

\* cited by examiner

Primary Examiner—Lee Nguyen
Assistant Examiner—Brandon J. Miller
(74) Attorney, Agent, or Firm—Michael Schmitt (57) ABSTRACT

A data carrier (2) can communicate with a station (1) during a respective time slot (TS) within successively generated time slot sequences (TSS), the data carrier (2) being provided with time slot fixation means (83) by means of which fixation means (83) the data carrier (2) can be fixed each time to the same respective time slot (TS) of successively generated time slot sequences (TSS).

7 Claims, 6 Drawing Sheets

DATA CARRIER INCLUDING A CIRCUIT WITH TIME SLOT DETERMINATION MEANS AND TIME SLOT FIXATION MEANS

The invention relates to a data carrier which is constructed for contactless communication with a station which is at least suitable for reading, and includes receiving means for receiving data blocks and transmission means for transmitting data blocks, and includes a circuit with a receiving terminal for receiving data blocks received by means of the receiving means and with a transmission terminal for outputting data blocks to be transmitted by means of the transmission means, and with time slot determination means which are arranged so as to determine each time slot of possibly repeatedly, successively running time slot sequences, each of which consists of a given number N of successive time slots, and with first processing means which are arranged to process a selection data block which is transmitted by a station in order to initiate a selection operation and is received via the receiving terminal and serves to select the data carrier from a plurality of data carriers, and with second processing means which are arranged to process, after the processing of a received selection data block by means of the first processing means, an identification data block which is stored in the circuit of the data carrier and can be applied, after its processing by means of the second processing means, during the duration of an $n^{th}$ time slot of a time slot sequence and via the transmission terminal, to the transmission means for transmission to a station, where $1 \leq n \leq N$, and with third processing means which are arranged to process, after correct reception in a station of an identification data block transmitted by the data carrier to this station, an acknowledge data block which is transmitted by this station to the data carrier and is received via the receiving terminal and is capable of setting the circuit of the data carrier to a selected state.

The invention also relates to a circuit which includes the following means, namely a receiving terminal for receiving received data blocks, and a transmission terminal for outputting data blocks to be transmitted, and time slot determination means which are arranged so as to determine each time slot of possibly repeatedly successively running time slot sequences, each of which consists of a given number N of successive time slots, and first processing means which are arranged to process a selection data block which is transmitted by a station, being at least suitable for reading, in order to initiate a selection operation and is received via the receiving terminal and serves to select the circuit from a plurality of circuits, and second processing means which are arranged to process, after the processing of a received selection data block by means of the first processing means, an identification data block which is stored in the circuit and can be applied, after its processing by means of the second processing means and during the duration of an $n^{th}$ time slot of a time slot sequence, to the transmission terminal for transmission to a station, where $1 \leq n \leq N$, and third processing means which are arranged to process, after correct reception in a station of an identification data block transmitted by the circuit to this station, an acknowledge data block which is transmitted by this station to the circuit and is received via the receiving terminal and is capable of setting the circuit to a selected state.

A data carrier of the kind set forth in the first paragraph and a circuit for a data carrier of the kind set forth in the second paragraph are known, for example from the patent document U.S. Pat. No. 5,539,394 A. When a known data carrier of this kind is present, together with a plurality of similar data carriers, within the communication range of a station which is at least suitable for reading, a data carrier can be selected in each time slot during a selection operation where a time slot sequence is executed. During such a selection operation, each selected data carrier transmits its identification data block to the station so that after such a selection operation the station knows the identity of the data carriers selected in the course of the executed selection operation. Subsequently, the station can address each selected data carrier individually in order to execute at least one communication operation with each selected data carrier, for example a read operation or a write operation or another operation.

It is a drawback of the known data carrier that, after selection of a given number of such known data carriers, in order to carry out a communication operation each of the selected data carriers must be addressed by way of a separate instruction so as to activate the relevant communication operation. The individual addressing of each selected data carrier by means of a respective instruction leads to a comparatively long communication interval; this is detrimental considering the need for as fast as possible communication with an as large as possible number of data carriers. Furthermore, because of the individual addressing of each selected data carrier by way of a respective instruction, a station arranged to communicate with the selected data carriers must generate and transmit a number of instructions which corresponds to the number of selected data carriers and hence produce a number of modulation steps, proportional to the number of instructions, in a carrier signal which serves for the transmission of the instructions to the data carriers and is in this case amplitude modulated; consequently, comparatively high levels occur in the range of the side bands of the amplitude modulated carrier signal used to transmit the instructions; in many countries this gives rise to conflicts with the rules and regulations concerning radio interference or radio interference limits.

It is an object of the invention to eliminate the described problems and to provide an improved data carrier of the kind set forth in the first paragraph as well as an improved circuit of the kind set forth in the second paragraph. In order to achieve this object, a data carrier of the kind set forth in the first paragraph according to the invention is characterized in that the circuit of the data carrier includes time slot fixation means by means of which fixation means, subsequent to the processing of the acknowledge data block by means of the third processing means, the respective $n^{th}$ time slot of successively running time slot sequences can be fixed for the circuit of the data carrier, and that the circuit of the data carrier includes control means by means of which control means, after fixation of the circuit of the data carrier to the respective $n^{th}$ time slot, communication between the data carrier and a station can be enabled only during the respective $n^{th}$ time slot fixed for the circuit of the data carrier.

In order to achieve the described object, a circuit of the kind set forth in the second paragraph according to the invention is characterized in that the circuit is provided with time slot fixation means by means of which fixation means, subsequent to the processing of the acknowledge block by means of the third processing means, respective the $n^{th}$ time slot of successively running time slot sequences can be fixed for the circuit, and that the circuit includes control means by means of which control means, after fixation of the circuit to the respective $n^{th}$ time slot, communication between the circuit and a station can be enabled only during the respective $n^{th}$ time slot fixed for the circuit.

Using only few means the steps according to the invention ensure in a simple manner that, after selection of a number of data carriers constructed according to the invention, the station intended for communication with the selected data carriers need generate and transmit only a single instruction in order to activate a desired communication operation with each of the selected data carriers; this instruction, being valid for all selected data carriers, ensures activation of the desired communication operation, subsequent to this instruction, during the time slot fixed for each of the selected data carriers. It is thus achieved that a single instruction for activating a communication operation suffices to carry out such a communication operation with each of the selected data carriers successively, resulting in a communication interval of optimum short length. Moreover, it is thus achieved that a modulated carrier signal which is transmitted by a station in order to transmit the instruction to the data carriers according to the invention includes only the modulation steps required for the transmission of this single instruction, so that only small level values occur in the range of the side bands of the modulated carrier signal and conflicts with rules and regulations concerning radio interference or radio interference limits are definitely avoided.

It has been found that it is very advantageous to take the steps disclosed in the Claims 2, 3 and 5, 6, respectively, for a data carrier and a circuit according to the invention, because these steps enable a very simple and reliable implementation.

These and other aspects of the invention will be apparent from the embodiment described hereinafter.

The invention will be described in detail hereinafter with reference to an embodiment shown in the drawings; however, the invention is not restricted thereto.

Figure 1:
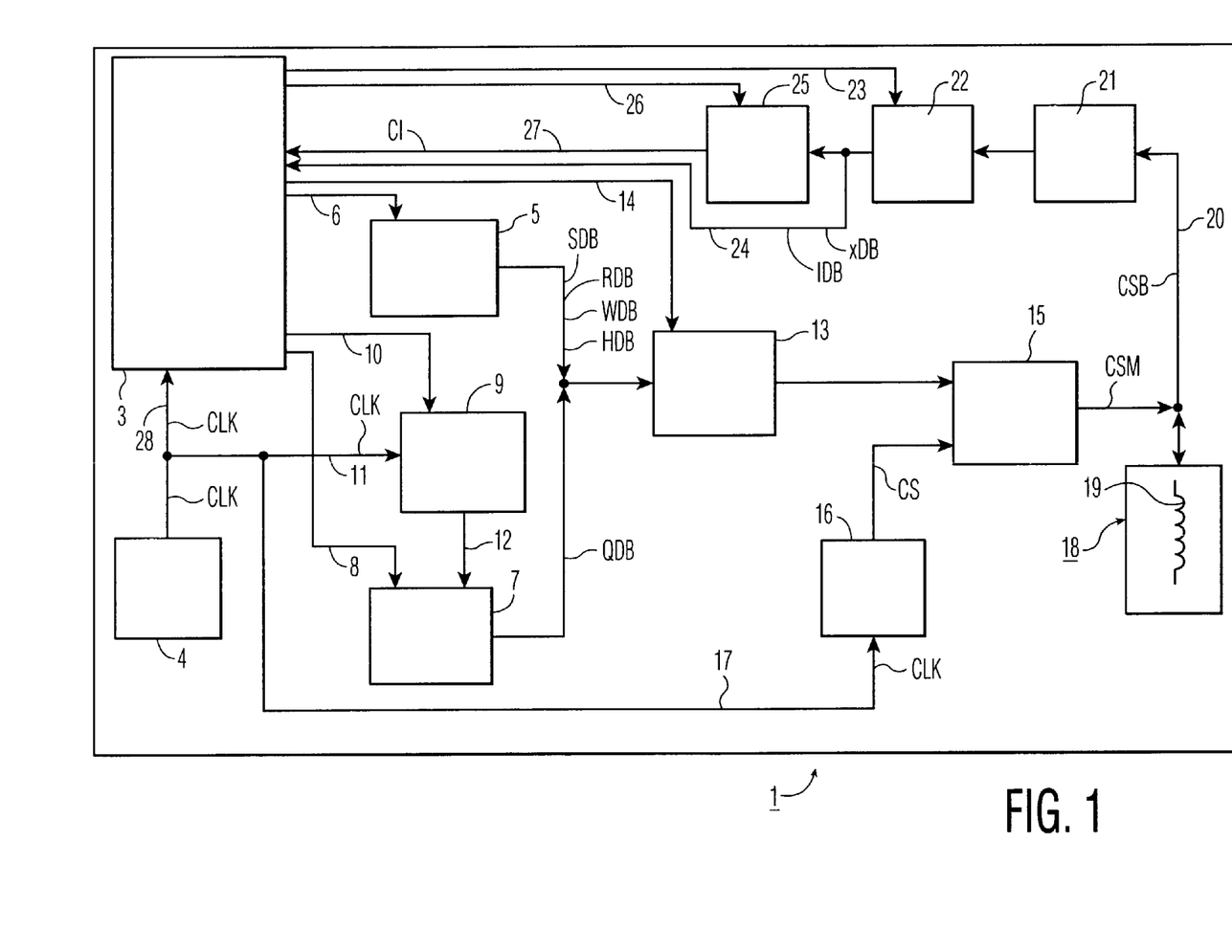
FIG. 1 shows a block diagram of an in this context essential part of a write/read station for contactless communication with a data carrier according to the invention.
Figure 2:
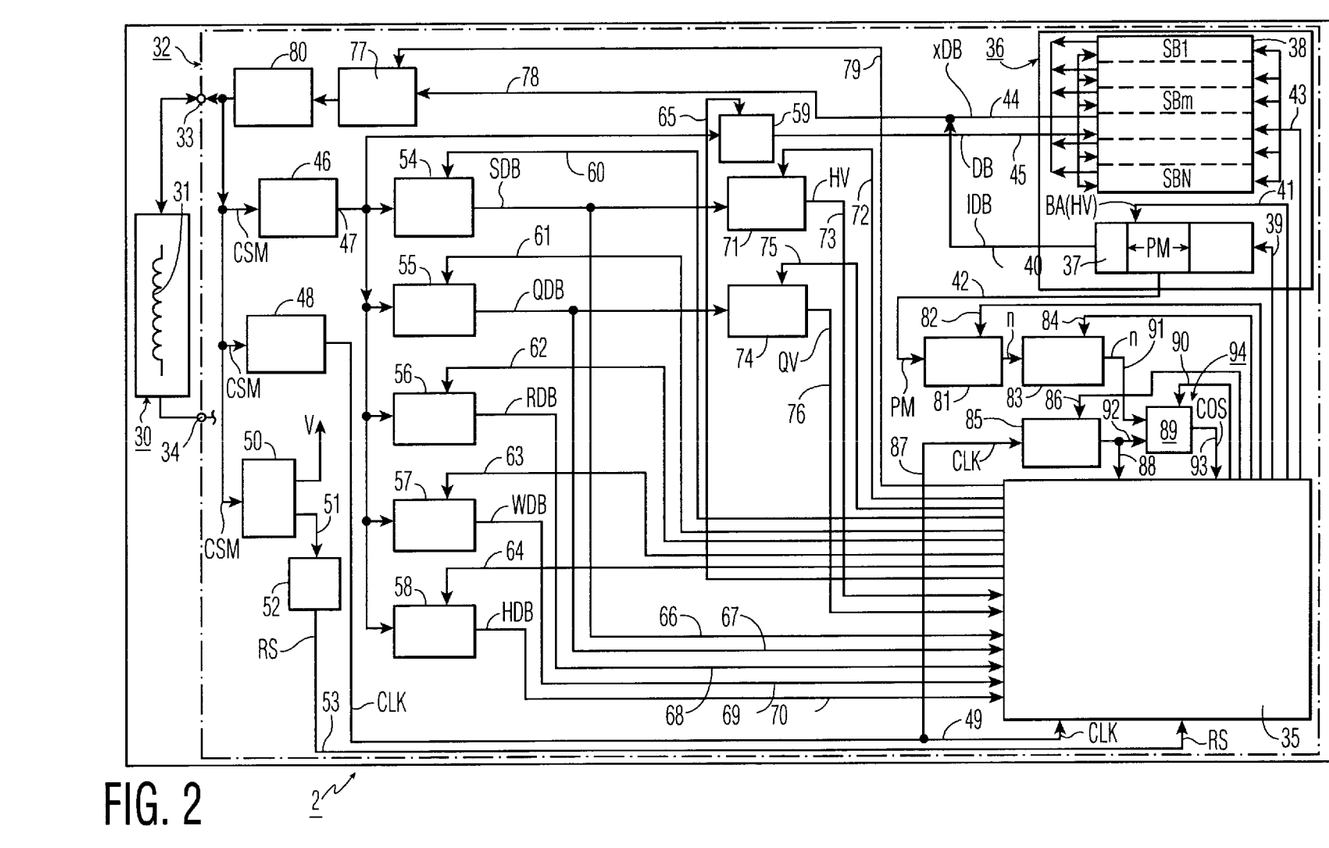
FIG. 2 shows, in the same way as FIG. 1, an in this context, essential part of a data carrier according to the invention.

FIG. 1 shows a write/read station 1 which will be referred to hereinafter as the station 1 for the sake of brevity. The station 1 is arranged and constructed for communication with a plurality of data carriers 2. FIG. 2 shows such a data carrier 2.

In respect of the communication between the station 1 and the data carriers 2 it is to be noted in advance that such communication takes place mainly in the form of data blocks DB, each data block DB consisting of a predetermined number of bytes, each byte consisting of a predetermined number of bits, being 8 bits in the present case. Instruction data blocks are to be transferred from the station 1 to the data carriers 2 in the course of a communication between the station 1 and the data carriers 2; the following instruction data blocks can be mentioned in this respect: a selection data block SDB, a read data block RDB, a write data block WDB, and a stop data block HDB. Furthermore, the station 1 can also transfer an acknowledge data block QDB to the data carriers 2. The station 1 can also transfer further instruction data blocks to the data carriers 2, but such further blocks are not elaborated herein.

A selection data block SDB contains a selection instruction code, a hash value HV and information concerning a given number of time slots TS as well as, indirectly, information concerning the length of such time slots TS.

A read data block RDB contains a read instruction code and information that from a memory of a data carrier 2 overall x data blocks DB (xDB) are to be read from x storage cells SB as from a storage cell bearing the address y, as well as, indirectly, information concerning the length of time slots TS.

A write data block WDB contains a write instruction code, a hash value HV as well as a data block DB which is to be written into a storage cell having the address m in a memory of a data carrier 2 as well as, indirectly, information concerning the length of time slots TS.

A stop data block HDB contains a stop instruction code and a hash value HV as well as, indirectly, information concerning the length of time slots.

A data carrier 2, or several data carriers 2, can be selected from a plurality of data carriers 2 by means of a selection data block SDB.

A predetermined number x of data blocks DB (xDB) can be read from a memory of a data carrier 2, or from a respective memory of each of a plurality of data carriers 2, by means of a read data block RDB.

Using a write data block WDB, a data block DB can be written into a storage cell SB of a data carrier 2 or into a respective storage cell SB of each of a plurality of data carriers 2.

Using a stop data block HDB, a data carrier 2, or a plurality of data carriers 2, can be driven or set to a stop state in which a data carrier 2 does not respond to any further instruction data blocks arriving therein for as long as a data carrier 2 has not been withdrawn from the range of communication with the station 1. It is only when a data carrier 2 is brought into the communication range of the station 1 again, in which case a so-called "power-on-reset" takes place in known manner, that a data carrier 2 can start to communicate with the station 1 again.

In the course of the communication between the station 1 and a data carrier 2, the station 1 can also generate an acknowledge data block QDB. Using an acknowledge data block QDB, the station 1 informs a data carrier 2 first of all that the station 1 has correctly received an identification data block IDB transmitted to the station 1 by a data carrier 2, and secondly that the instruction corresponding to an instruction data block previously transmitted to a data carrier 2 is to be executed by a data carrier 2. The acknowledge data block QDB may be formed, for example as a data block containing a given bit pattern.

In the course of a communication between the station 1 and a data carrier 2, a data carrier 2 transmits an identification data block IDB to the station 1. The identification data block IDB is significant of the relevant data carrier 2. Each data carrier 2 contains an identification data block IDB which is reserved specifically for this carrier and is issued only once. For example, such an identification data block IDB may represent a so-called serial number.

The construction of the station 1 will be described in detail hereinafter with reference to FIG. 1.

The station 1 includes sequencing means 3 which control a plurality of routines and functions, only the essential routines and functions thereof being described in detail hereinafter.

The station 1 also includes a clock signal generator 4 which generates a clock signal CLK having a frequency of 13.56 MHz. The clock signal CLK can be applied to the sequencing means 3 via a connection 28.

The station also includes first generating means 5 which are arranged to generate the instruction data blocks, i.e. to generate selection data blocks SDB, read data blocks RDB, write data blocks WDB and stop data blocks HDB. The first generating means 5 can be controlled by the sequencing means 3 via a connection 6.

The station 1 also includes second generating means 7 which are arranged to generate the acknowledge data block QDB. The second generating means 7 can be controlled by the sequencing means 3 via a connection 8.

The station 1 also includes a time slot counter 9 which constitutes time slot determination means and whereby each time slot TS in time slot sequences TSS can be determined, each time slot sequence TSS consisting of a given number N of successive time slots TS. For example, a time slot sequence may consist of 1, 4, 8, 16, 32, 64, 128 or 256 time slots. The time slot counter 9 can be controlled by the sequencing means 3 via a connection 10. The clock signal CLK can be applied to the time slot counter 9 via a connection 11. The content of the time slot counter 9 can be applied to the second generating means 7 via a connection 12.

The station 1 includes encoding means 13 which can receive the instruction data blocks SDB, RDB, WDB and HDB, generated by the first generating means 5, as well as the acknowledge data block QDB, generated by the second generating means 7, and can provide the encoding of the data blocks applied thereto. The encoding means 13 can be controlled by the sequencing means 3 via a connection 14.

Modulation means 15 which can receive the encoded data blocks are connected to the encoding means 13. In the present case the modulation means 15 are formed by amplitude modulation means which can receive a carrier signal CS and provide amplitude modulation of the carrier signal CS in dependence on the encoded data blocks supplied by the encoding means 13. The amplitude modulation means 15 are arranged to carry out a 10% amplitude modulation (ASK 10%) and output an amplitude modulated carrier signal CSM.

The station 1 includes a carrier signal generator 16 for generating the carrier signal CS, which generator can receive the clock signal CLK via a connection 17 and generates the carrier signal CS in dependence on the clock signal CLK, which carrier signal also has a frequency of 13.56 MHz in this case.

Connected to the modulation means 15 are transmission/receiving means 18 which include a transmission coil 19 which can inductively transmit the amplitude modulated carrier signal CSM, output by the modulation means 15, to receiving means of data carriers 2. The transmission/receiving means 18 thus constitute transmission means.

The transmission/receiving means 18 at the same time constitute receiving means whereby signals inductively transmitted to the station 1 by data carriers 2 can be received. Such signals can be applied to demodulation means 21 of the station 1 via a connection 20. The demodulation means 21 in the present case are arranged to demodulate a load modulated carrier signal CSB, because the inductive data transmission from the carriers 2 to the station 1 takes place in known manner by so-called load modulation of the carrier signal CS. Connected to the demodulation means 21 are decoding means 22 for the decoding of received data blocks. The decoding means 22 can be controlled by the sequencing means 3 via a connection 23. Decoded identification data blocks IDB or data blocks xDB output by the decoding means 22 can be applied, via a connection 24, to the sequencing means 3 in order to be subjected to further processing by means of the sequencing means 3.

Collision detection means 25 which can be controlled by the sequencing means 3, via a connection 26, are connected to the decoding means 22. The collision detection means 25 are arranged to detect collisions between two identification data blocks IDB, a collision of this kind being detected on a bit basis. Such a collision of identification data blocks IDB may occur when two or more identification data blocks IDB are received in the same time slot in the station 1. When the collision detection means 25 detect such a collision of identification data blocks IDB, collision information CI is applied to the sequencing means 3, via a connection 27, so that the sequencing means 3 can perform an appropriate control operation which will be described in detail hereinafter.

The construction of the data carrier 2 will be described in detail hereinafter on the basis of the data carrier 2 shown in FIG. 2.

The data carrier 2, being constructed for contactless communication with a station which is constructed at least for reading, such as the station 1 of FIG. 1, includes receiving/transmission means 30 which include a transmission coil 31 and constitute receiving means for receiving data blocks DB as well as transmission means for transmitting data blocks DB.

The data carrier 2 includes a circuit 32 whose parts which are of essential importance in the present context are shown in FIG. 2. The circuit 32 is constructed as an integrated circuit. The circuit 32 includes a first terminal 33 and a second terminal 34 which are connected to the receiving/transmission means 30. In this case the first terminal 33 forms a receiving terminal for receiving data blocks DB, received by means of the receiving/transmission means 30, as well as a transmission terminal for outputting data blocks DB to be transmitted by means of the transmission/receiving means 30. The circuit 32 includes sequencing means 34 whereby a plurality of routines and functions of the data carrier 2 can be controlled; however, only the routines and functions thereof which are of relevance in the present context will be described in detail hereinafter.

The circuit 32 also includes storage means 36 which are formed by an EEPROM in the present case. However, the storage means 36 may also be implemented in a different manner. The storage means 36 include a first storage section 37 and a second storage section 38. The storage section 37 is arranged to store the identification data block IDB characterizing the data carrier 2. The identification data block IDB consists, for example of a total of 8 bytes comprising 8 bits each. The first storage section 37 can also be controlled, via a connection 39, by the sequencing means 35 in order to output the identification data block IDB stored in the first storage section 37 via a connection 40. Moreover, the first storage section 37 can be controlled by the sequencing means 35 via a further connection 41. Via the connection 41, the first storage section 37 can receive a bit address BA(HV) which corresponds to a hash value HV and forms an initial address for a part PM of the identification data block IDB stored in the first storage section 37. The part PM, determined by the hash value HV, of the identification data block IDB can be output via a connection 42 by controlling the first storage section 37 via the connection 41.

The second storage section 38 of the storage means 36 consists of a total of N storage cells SB1 ... SBm ... SBN, each storage cell SB being arranged to store a total of 4 bytes. The second storage section 38 can be controlled by the sequencing means 35, via a connection 43, either to read a predetermined number x of data blocks DB from the second storage section 38 for output via a connection 44, or to store a data block DB, applied to the second storage section 38 via a connection 45, in one of the storage cells SB1 . . . SBm . . . SBN.

The data carrier 2 includes demodulation means 46 which constitute amplitude demodulation means which are connected to the first terminal 33 and are suitable for demodulating the amplitude modulated carrier signal CSM transmitted by a station 1. The demodulation means 46 output the data blocks DB, transmitted to the data carrier 2, in demodulated but still encoded form via an output 47.

The data carrier 2 also includes clock signal regenerating means 48 which are also connected to the first terminal 33. The clock signal regenerating means 48 can regenerate the clock signal CLK from the received amplitude modulated carrier signal CSM so that he clock signal CLK is available in the data carrier 2 as well as in the station 1 transmitting the modulated carrier signal CSM. The regenerated clock signal CLK is applied to the sequencing means 35 via a connection 49.

The data carrier 2 also includes DC voltage generating means 50 which are also connected to the first terminal 33 and can generate, while using the amplitude modulated carrier signal CSM, a DC supply voltage V which serves to power the entire circuit 32. It is to be noted that the DC voltage generating means 50 include voltage limiting means in order to prevent in known manner the occurrence of an excessive supply voltage V.

Reset signal generating means 52 are connected to the DC voltage generating means 50, via a connection 51, in order to generate a reset signal RS upon occurrence of a DC supply voltage V; this is the case when the data carrier 2 enters the communication range of a station 1, said reset signal being capable of initiating a so-called "power-on-reset". The reset signal RS can be applied to the sequencing means 35 via a connection 53.

The data carrier 2 includes a series of decoding means for the decoding of encoded data blocks which appear on the output 47 of the demodulation means 46; FIG. 2 shows a total of six of such decoding means. These means are first decoding means 54 for decoding a selection data block SDB, second decoding means 55 for decoding an acknowledge data block QDB, third decoding means 56 for decoding a read data block RDB, fourth decoding means 57 for decoding a write data block WDB, fifth decoding means 58 for decoding a stop data block HDB, and sixth decoding means 59 for decoding data blocks DB to be stored in the second storage section 38. The inputs of the above-mentioned decoding means 54, 55, 56, 57, 58 and 59 are connected to the output 47 of the demodulation means 46. The first decoding means 54 can be controlled by the sequencing means 35 via a connection 60; the second decoding means 55 can be controlled thereby via a connection 61, the third decoding means 56 via a connection 62, the fourth decoding means 57 via a connection 62, the fifth decoding means 58 via a connection 64, and the sixth decoding means 59 via a connection 65. The outputs of the decoding means 54, 55, 56, 57 and 58 are connected to the sequencing means 35 via connections 66, 67, 68, 69 and 70 so that the decoded data blocks SDB, QDB, RDB, WDB and HDB can be applied to the sequencing means 35 for the purpose of further processing. The connection 45 which leads to the second storage section 38 is connected to the output of the sixth decoding means 59.

To the output of the first decoding means 54 there are connected determination means 71 which can be controlled by the sequencing means 35 via a connection 72. The determination means 71 are arranged and constructed so as to determine a hash value HV which is contained in a selection data block SDB to be transmitted to the data carrier 2. A hash value HV determined by means of the determination means 71 can be output to the sequencing means 35, via a connection 73, in order to be further processed in the sequencing means 35.

To the output of the second decoding means 55 there are connected test means 74 which can be controlled by the sequencing means 35 via a connection 75. The test means 74 are constructed in such a manner that they can test the validity of an acknowledge data block QDB. In case an acknowledge data block QDB is characterized by a given bit pattern, as mentioned before, the test means 74 test whether an acknowledge data block QDB received contains exactly the relevant bit pattern. In the case of a positive test result, i.e. when a valid acknowledge data block QDB has been received, the test means 74 generate an "acknowledge valid" signal QV which can be applied, via a connection 76, to the sequencing means 35 for further processing.

The circuit 32 of the data carrier 2 also includes encoding means 77, the input of which is connected to a connection 78 which is connected to the connection 40 as well as to the connection 44. The encoding means 77 can be controlled by the sequencing means 35 via a connection 79. The encoding means 77 are capable of encoding the identification data block IDB read from the first storage section 37 as well as the data blocks xDB read from the second storage section 38. After completion of the encoding by means of the encoding means 77, the encoded data blocks can be applied to modulation means 80. In the modulation means 80 an auxiliary carrier signal is subjected in known manner to a modulation corresponding to the encoded data blocks, after which the modulated auxiliary carrier signal is applied, via the first terminal, to the receiver/transmitter means 30 so as to be inductively transmitted to a station 1.

The circuit 32 of the data carrier 2 also includes a so-called CRC8-stage 81 which can be controlled by the sequencing means 35 via a connection 82. The CRC8-stage 81 can receive, via the connection 42, the part PM of the identification data block IDB which was read from the first storage section 37 in conformity with the hash value HV, determined by the determination means 71, by means of the sequencing means 35. The part PM applied to the CRC8-stage 81 is shifted through the CRC8-stage 81; during this operation an algorithm that can be implemented by the CRC8-stage 81 is executed, after which a given value n is obtained at the output of the CRC8-stage 81. The value n is subsequently stored in a time slot register 83 which can be controlled by the sequencing means 35 via a connection 84.

The circuit 32 of the data carrier 2 also includes a time slot counter 85 which can be controlled by the sequencing means 35 via a connection 86. The time slot counter 85 constitutes time slot determination means. The time slot counter 85 is arranged to determine each time slot TS of possibly repeatedly successively running time slot sequences TSS. Each of these time slot sequences TSS consists of a given number N of successive time slots TS. The number N that can be determined by means of the time slot counter 85 and the length of the successive time slots TS of time slot sequences TSS always correspond to the number and the length of the time slots TS of time slot sequences TSS determined by the time slot counter 9 of a station 1. The time slot counter 85 can receive, via the connection 49 and a further connection 87, the clock signal CLK regenerated by means of the clock signal regenerating means 48. On the basis of the regenerated clock signal CLK, the time slot counter 85 determines each time slot TS of successively running time slot sequences TSS. The relevant content of the time slot counter 85 can be applied from the output of the time slot counter 85, via a connection 88, to the sequencing means 35 so that the relevant contents are available for control purposes in the sequencing means 35.

The circuit 32 of the data carrier 2 also includes a comparator 89 which can be controlled by the sequencing means 35 via a connection 90. The comparator 89 can receive, via a connection 91, the content n of the time slot register 83 as well as, via the connection 92, the content of the time slot counter 85. The comparator 89 provides a comparison of the contents received and outputs, in the case of corresponding received contents, a comparator signal COS to the sequencing means 35 via a connection 93. Communication between the data carrier 2 and a station 1 can be enabled for a given time slot TS in dependence on the comparator signal COS as will be described in detail hereinafter.

The first decoding means 54 constitute first processing means which are arranged to process, i.e. to decode, a selection data block SDB which is transmitted by a station 1 in order to initiate a selection operation and is received via the terminal 33, said selection data block enabling the selection of the data carrier 2 from a plurality of data carriers 2.

The encoding means 77 constitute second processing means which are arranged to process, after the processing, i.e. the encoding, of a received selection data block SDB by means of the first processing means, so the first encoding means 54, an identification data block IDB which is stored in the circuit 32 of the data carrier 2 and can be applied, during the duration of a given time slot TS of a time slot sequence TSS, after its processing by means of the second processing means, so the encoding means 77, to the receiving/transmission means 30, via the terminal 33, for transmission to the station 1. The given time slot should be the $n^{th}$ time slot, where $1 \leq n \leq N$.

The second decoding means 55 constitute third processing means which are arranged to process, i.e. to decode, after correct reception of an identification data block IDB transmitted by the data carrier 2 to a station 1, an acknowledge data block QDB which is transmitted by the station 1 to the data carrier 2 and is received via the terminal 33, which acknowledge data block can set the circuit 32 of the data carrier 2 to a "selected" state as will be described in detail hereinafter.

The time slot register 83 in the data carrier 2 constitutes time slot fixation means which can fix, after the processing of the acknowledge data block QDB by means of the third processing means, so the second decoding means 55, the respective $n^{th}$ time slot TS of successively generated time slot sequences TSS for the circuit 32 of the data carrier 2, or the data carriers 2, as will be described in detail hereinafter.

The comparator 89 and the sequencing means 35 constitute control means 94 by means of which control means 94, after fixation of the circuit 32 of the data carrier 2 to the respective $n^{th}$ time slot TS, communication can be enabled between the data carrier 2 and a station 1 only during the respective $n^{th}$ time slot TS fixed for the circuit 32 of the data carrier as will also be described in detail hereinafter.

Figure 3:
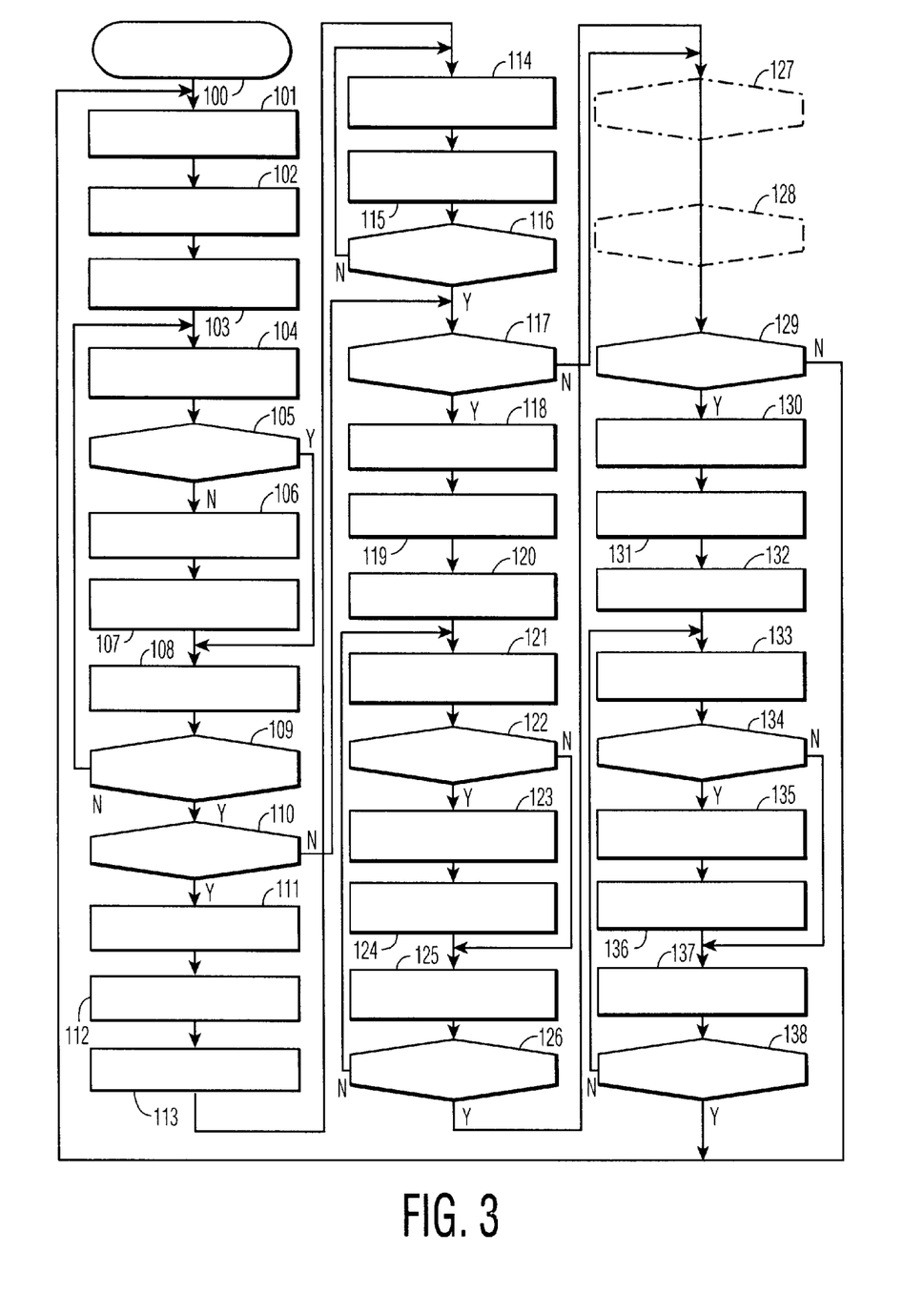
FIG. 3 shows a flow chart illustrating the execution of a program in the write/read station shown in FIG. 1.

The part of the operation of the station 1 of FIG. 1 which is essential in this context will be described in detail hereinafter with reference to the time diagram shown in FIG. 5 and with reference to a program run which will be described in conformity with the flow chart given in FIG. 3.

This program run starts in a block 100. During a next block 101, a selection data block SDB is generated, using the first generating means 5, in order to initiate a selection operation as indicated on line 1 of FIG. 5. In a next block 102, the previously generated selection data block SDB is encoded by means of the encoding means 13; this means at the same time that the encoded selection data block SDB is amplitude modulated by means of the modulation means 15 and subsequently transmitted, using the transmission/receiving means 18, to all data carriers 2 present in the communication range of the station 1.

Figure 5:
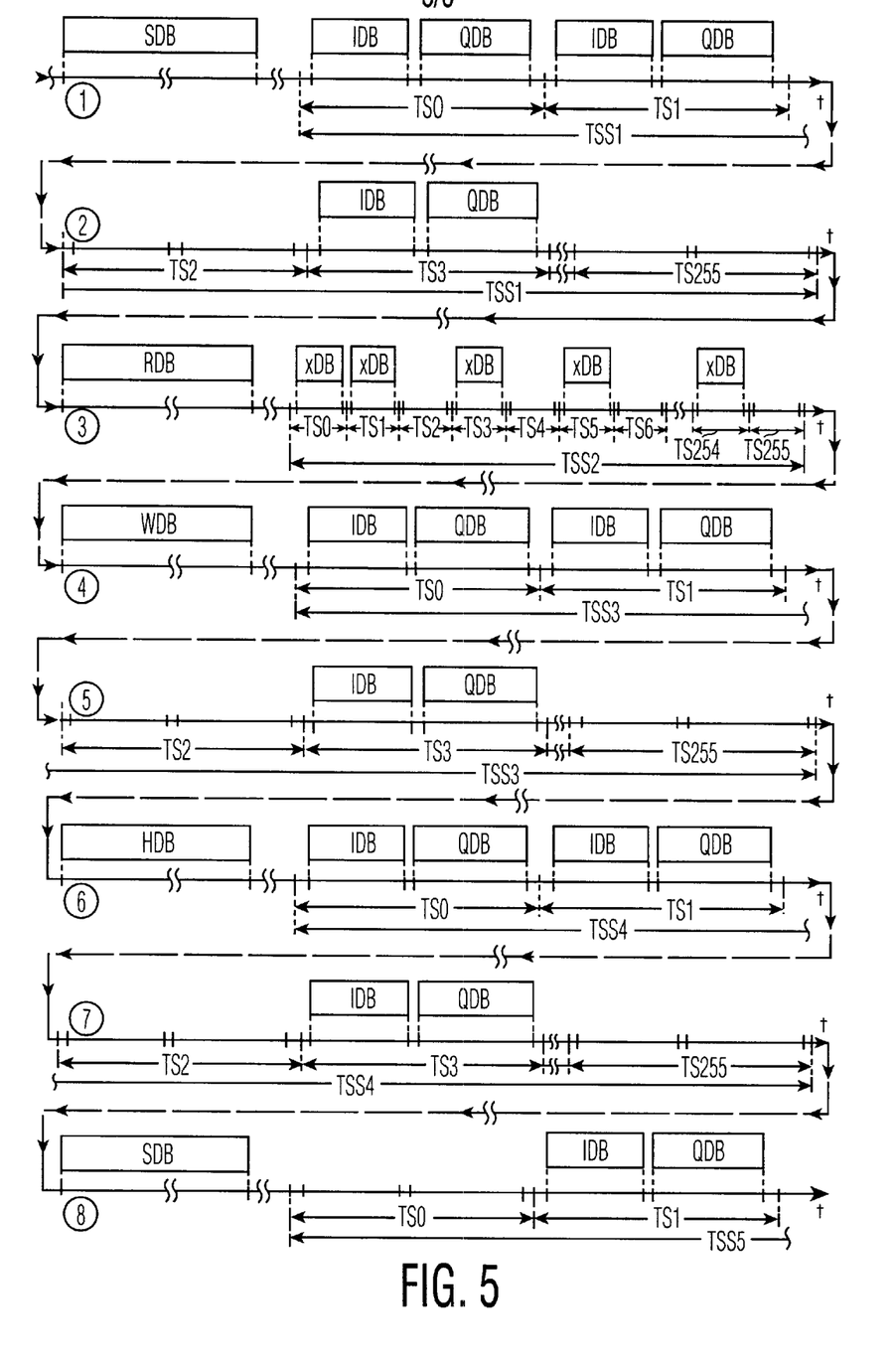
FIG. 5 shows a time diagram illustrating the temporal sequence of data blocks occurring in the course of a communication operation between the write/read station of FIG. 1 and the data carrier of FIG. 2.

During a next block 103, the content of the time slot counter 9 is set to the value "0"; the first time slot TS0 of a first time slot sequence TSS1 then runs as appears from line 1 of FIG. 5.

After the transmission of the selection data block SDB, it may occur that during the first time slot TS0 of the first time slot sequence TSS1 either no data carrier 2 responds or exactly one data carrier 2 responds or more than one data carrier 2 respond and transmit their identification data block IDB to the station 1.

During a block 104 each identification data block IDB received is decoded by means of the decoding means 22, after which the identification data block IDB is applied to the sequencing means 3. During a block 105, it is subsequently detected, using the collision detection means 25, whether a collision has occurred between at least two identification data blocks IDB or whether no identification data block IDB has even been received and decoded. When it is determined in the block 105 that only a single identification data block IDB has been decoded, during a subsequent block 106 the generating of the acknowledge data block QDB by means of the second generating means 7 is initiated. Subsequently, in a block 107 the acknowledge data block QDB generated is encoded by means of the encoding means 13, with the result that the carrier signal CS is modulated in conformity with the encoded acknowledge data block by means of the modulation means 15; subsequently, the modulated carrier signal CSM is transmitted to the data carrier 2 wherefrom the identification data block IDB has been received in the first time slot TS0 in conformity with the block 104.

The program run then continues in a block 108. In the block 108 the program run is continued also if a collision between at least two identification data blocks IDB or non-reception of an identification data block IDB is detected in the block 105. In the block 108 the content of the time slot counter 9 is incremented by the value "1". This means that the second time slot TS1 of the first time slot sequence TSS1 runs.

Subsequently, in a block 109 it is checked whether the last time slot TSN has already been passed, so whether the last time slot TSN has already elapsed. If this is not the case, the program run is continued in the block 104, after which the blocks 105, 106, 107, 108 and 109 are completed again; as assumed in conformity with FIG. 5, for example each time only one data carrier 2 has then transmitted an identification data block IDB to the station 1 during the second time slot TS1, during the fourth time slot TS3, during the sixth time slot TS5, and during the last but one time slot TS254 of the first time slot sequence TSS1, whereas in all other time slots TS of the first time slot sequence TSS1 either a collision between two identification data blocks IDB has been detected or non-reception of identification data blocks IDB.

When the last time slot TSN, being the time slot TS255 in the example shown in FIG. 5, of the first time slot sequence TSS1 has elapsed, and hence this sequence is subsequently exceeded, the program run is continued in a block 110 in conformity with the flow chart of FIG. 3.

In the block 110 it is checked whether a read data block RDB is to be transmitted. Information in this respect is contained in the sequencing means 3. When a read data block RDB is to be transmitted, subsequently in a block 111 such a read data block RDB is generated by means of the first generating means 5 for the purpose of initializing a read operation; this is shown on line 3 in FIG. 5. Subsequently, in a block 112 the read data block RDB generated is encoded by means of the encoding means 13, with the result that, after modulation by means of the modulation means 15, the generated and encoded read data block RDB is transmitted to all data carriers 2 selected in the course of the preceding selection operation during the first time slot sequence TSS1.

Subsequently, in a block 113 the content of the time slot counter 9 is set to the value "0"; the first time slot TS0 of a second time slot sequence TSS2 then runs as can be deduced from line 3 of FIG. 5. As is shown in FIG. 5, the length of the time slots TS of the second time slot sequence TSS2 is shorter than the length of the time slots TS of the first time slot sequence TSS1. This is automatically imposed by the sequencing means 3, because the sequencing means 3 contain information concerning the previously executed generating of a read data block RDB and hence know that only shorter time slots TS are required, because less time is required for read operations.

After the block 113, the program run continues in a block 114 in which the predetermined number x of data blocks DB, transmitted to the station 1 by the data carrier 2 selected in the first time slot TS0, are decoded by means of the decoding means 22. The decoded data blocks xDB are applied, via the connection 24, to the sequencing means 3 and are further processed by the sequencing means 3; however, this processing will not be elaborated upon herein.

Subsequently, in a block 115 the content of the time slot counter 9 is incremented by the value "1"; the second time slot TS1 of the second time slot sequence TSS2 then runs. Subsequently, in a block 116 it is checked whether the last time slot TS255 has already been passed. If this is not the case, the program run is continued in the block 114, after which the blocks 115 and 116 are completed again; in the time slots TS1, TS3, TS5 and TS254 each time x data blocks DB (xDB) are then successively transmitted to the station 1 by a respective data carrier in the time slots TS1, TS3, TS5 and TS254 of the second time slot sequence TSS2; these blocks are decoded by means of the decoding means 22 and applied, via the connection 24, to the sequencing means 3 for further processing.

When the test in the block 116 yields a positive result, the program run is continued in a block 117 in which it is continued even when a negative test result is obtained in the block 110, i.e. if no read operation is desired. In the block 117 it is tested whether a write data block WDB is to be transmitted, i.e. whether the station 1 should perform a write operation in the data carriers 2 selected in the previously counted time slots TS1, TS3, TS5 and TS254. Information in this respect is contained in the sequencing means 3.

If the test result in the block 117 is positive, in order to initiate a write operation the generating of a write data block WDB by means of the first generating means 5 is then initiated in a block 118 as indicated on line 4 of FIG. 5. In a block 119 the write data block WDB generated is subsequently encoded by means of the encoding means 13, with the result that, after an appropriate modulation by means of the modulation means 15, the encoded write data block is applied to all data carriers 2 previously selected in the course of the selection operation during the first time slot sequence TSS1 (see lines 1 and 2 of FIG. 5).

After the transmission of the write data block WDB to all selected data carriers 2, each time fixed to a respective time slot TS, the program run is continued in a block 120. In the block 120 the content of the time slot counter 9 is set to the value "0" again; the first time slot TS0 of a third time slot sequence TSS3 then runs as indicated on line 4 of FIG. 5. The length of the time slots TS of the third time slot sequence TSS3 is again fixed, using the sequencing means 3, to the value which has already been fixed for the time slots TS of the first time slot sequence TSS1, as appears from FIG. 5.

Subsequently, the program run is continued in a block 121. In the block 121 the identification data block IDB to be transmitted in the course of a write operation by the data carrier 2 fixed to the first time slot TS0 is awaited and, after its arrival, it is decoded by means of the decoding means 22, after which the identification data block IDB is applied to the sequencing means 3. Subsequently, for reasons of safety it is checked again in a block 122 whether a write operation is to be performed indeed for the data carrier 2 fixed to the first time slot TS0. If this test offers a positive result, the program run is continued in a block 123 in which the second generating means 7 generate an acknowledge data block QDB. Subsequently, in a block 124 the generated acknowledge data block QDB is encoded by means of the encoding means 13; using the modulation means 15 and the transmission/receiving means 18, the acknowledge data block QDB is then transmitted to the data carrier 2 fixed to the first time slot TS0. As soon as the acknowledge data block QDB arrives in the data carrier 2 fixed to the first time slot TS0 and is recognized as being valid in the relevant data carrier 2, the write operation is indeed executed for the relevant data carrier 2.

The program run subsequently continues in a block 125 in which the content of the time slot counter 9 is incremented by the value "1"; the second time slot TS1 of the third time slot sequence TSS3 then runs. Subsequently, in a block 126 it is checked whether the last time slot TS255 of the third time slot sequence TSS3 has been passed. For as long as this is not the case, the program run is continued in the block 121, after which the blocks 122, 124, 125, and 126 are completed again. As a result, in the course of the write routine activated by the write data block WDB a respective write operation is also performed in the data carrier 2 fixed to the second time slot TS1, and in the data carrier 2 fixed to the fourth time slot TS3 and (not shown in FIG. 5) in the two data carriers 2 fixed to the time slots TS5 and TS254 of the third time slot sequence TSS3.

When the last time slot TS255 of the third time slot sequence TSS3 has been passed, the program is continued in a block 127 in which it continues also in the case of a negative test result in the block 117. The block 127 is representative of an operation which can be executed by the station 1 in all selected data carriers 2.(not described herein) and is terminated in a block 128.

Subsequently, the program continues in a block 129 in which it is checked whether the station 1 should transmit a stop data block HDB to each selected data carrier 2 fixed to a respective time slot TS. The information in this respect is contained in the sequencing means 3. In the case of a positive test result in the block 129, the program run continues in a block 130 in which, in order to initiate a termination operation or stop operation, a stop data block HDB is generated by means of the first generating means 5 as indicated on line 6 of FIG. 5. Subsequently, in a block 131 the stop data block HDB generated is encoded by means of the encoding means 13, so that it is transmitted to all selected data carriers 2. Subsequently, in a block 132 the content of the time slot counter 9 is set to the value "0", so that the first time slot TS0 of a fourth time slot sequence TSS4 is activated as appears from line 6 of FIG. 5. The length of the time slots TS of the fourth time slot sequence TSS4 corresponds to the length of the time slots TS of the first time slot sequence TSS1 and of the third time slot sequence TSS3. The length is fixed by the sequencing means 3.

Subsequently, in a block 133 the identification data block IDB transmitted by the data carrier 2 fixed to the first time slot TS0 is decoded, after which the identification data block IDB is applied to the sequencing means 3.

Subsequently, in a block 134 it is checked whether a termination operation or stop operation is to be executed indeed. This test is performed by means of the sequencing means 3. In the case of a positive test result, the second generating means 7 generate an acknowledge data block QDB in a block 135, which acknowledge data block is encoded by means of the encoding means 13 in a block 136 and subsequently transmitted to the data carrier 2 fixed to the first time slot TS0. The acknowledge data block QDB received in the data carrier 2 in this case ensures that the data carrier 2 is set to a "stop" state in which this data carrier does not respond to any further instructions or instruction data blocks for as long as it remains within the communication range of the station 1.

Subsequently, the program run continues in a block 137 in which the content of the time slot counter 9 is incremented by the value "1"; the second time slot TS1 of the fourth time slot sequence TSS4 then runs. Subsequently, in a block 138 it is tested whether the last time slot TS255 of the fourth time slot sequence TSS4 has already been passed. For as long as this is not the case, the program run cyclically continues through the blocks 133, 134, 135, 136, 137 and 138. The data carriers 2 fixed to the time slots TS1 and TS3 are then set to their respective "stop" states, as appears from FIG. 5, and the data carriers 2 fixed to the time slots TS5 and TS254 are also set to their "stop" state; however, the latter is not shown in FIG. 5.

Subsequent to the block 138, the program run is continued in the block 101; it also continues therein in the case of a negative test result in the block 129. During the renewed execution of the block 101, a selection data block DSB is again generated as shown on line 8 of FIG. 5, after which a fifth time slot sequence TSS5 is generated in which a respective single data carrier 2 is selected again in given time slots TS, said data carrier being fixed to the relevant time slot after successful selection as shown on line 8 of FIG. 5 for the second time slot TS1 of the fifth time slot sequence TSS5.

Figure 4A:
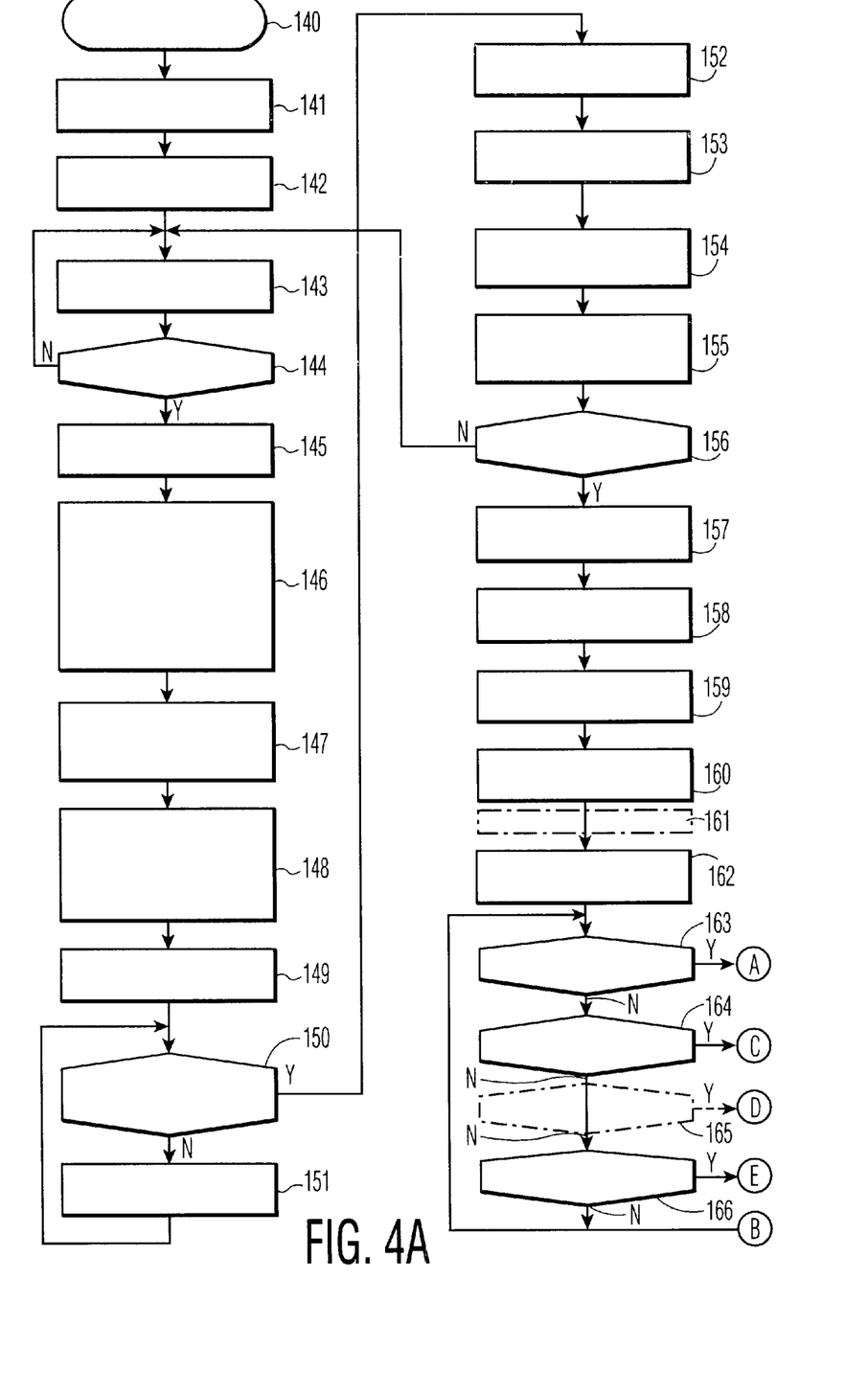
FIGS. 4A and 4B show a flow chart illustrating the execution of a program in the data carrier shown in FIG. 2.
Figure 4B:
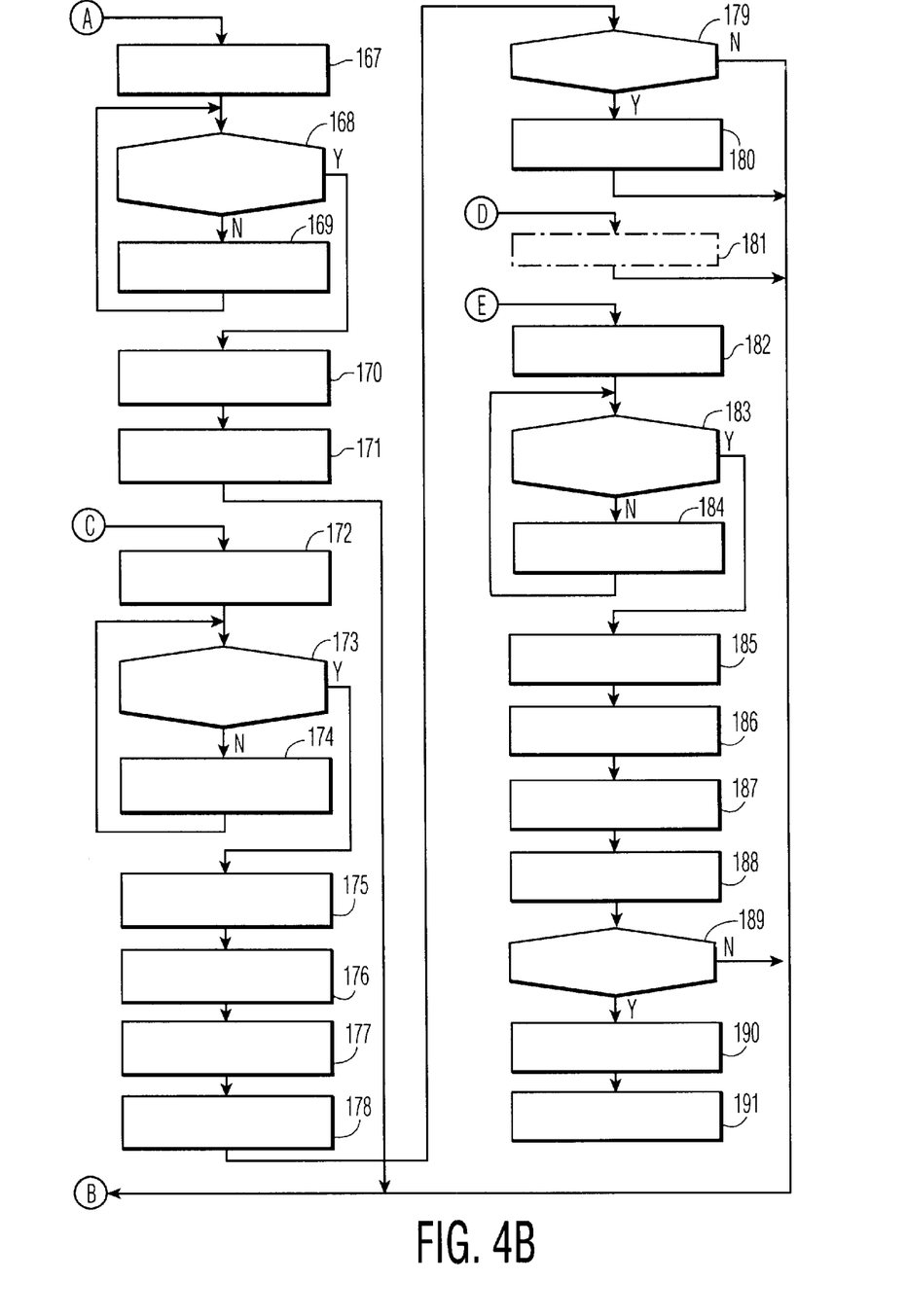

The operation of the data carrier 2 according to the invention will be described in detail hereinafter with reference to FIG. 2 and on the basis of the time diagram of FIG. 5 and with reference to a program run which will be described in detail hereinafter with reference to the flow chart shown in FIGS. 4A and 4B.

The program run commences in a block 140 and continues in a block 141 in which a so-called "power-on-reset" operation takes place; this is the case if the reset signal generating means 52 apply a reset signal RS to the sequencing means 35. This occurs whenever the data carrier 2 enters the communication range of the station 1 of FIG. 1.

Subsequently, in a block 142 the data carrier 2, or the circuit 32 of the data carrier 2, is set to a "non-selected" state.

Subsequently, in a block 143 the first decoding means 54 are activated. Subsequently, in a block 144 it is tested whether a selection data block SDB has been decoded by means of the first decoding means 54. For as long as this is not the case, the program run is continued again in the block 143 and subsequently in the block 144, so that these two blocks 143 and 144 are successively completed for as long as no selection data block SDB is received and decoded.

As soon as a selection data block SDB is received by the data carrier 2 and decoded by means of the first decoding means 54, the program run continues in a block 145 in which the hash value HV, contained in the previously decoded selection data block SDB, is determined by means of the determination means 71; this hash value HV is subsequently applied, via the connection 73, to the sequencing means 35 so that the first storage section 37 can be controlled, via the sequencing means 35, so as to fix the part PM of the identification data block IDB.

Subsequently, in a block 146 the part PM of the identification data block IDB, stored in the first storage section 37, is determined in conformity with the hash value HV previously determined from the decoded selection data block SDB by means of the determination means 71. Subsequently, in a block 147 the previously determined part PM, applied to the CRC8-stage 81 via the connection 42, is shifted through the CRC8-stage 81, resulting in a value n on the output of the CRC8-stage 81 which represents a CRC8 result. The CRC8 result, being the value n, is subsequently stored in the time slot register 83 in a block 148. A time slot TS bearing the number n for the data carrier 2 has thus been selected by means of the CRC8 result, so by means of the value n.

Subsequently, the program run is continued in a block 149 in which the content of the time slot counter 85 of the data carrier 2 is set to the value "0", the first time slot TS0 of the first time slot sequence TSS1 then runs, that is to say in perfect synchronism with the events in the station 1.

Subsequently, in a block 150 it is tested whether the content of the time slot counter 85 corresponds to the content of the time slot register 83. If this is not the case, the program run continues in a block 151 in which the content of the time slot counter 85 is incremented by the value "1". Subsequently, the program run is continued in the block 150. The blocks 150 and 151 are cyclically successively completed for as long as the content of the time slot counter 85 and the time slot register 83 differ.

However, as soon as the test in the block 150 reveals that the content of the time slot counter 85 corresponds to the content of the time slot register 83, the program run is continued in a block 152. In the block 152 the identification data block IDB stored in the first storage section 37 is read and applied to the encoding means 77, via the connections 40 and 78, after which the identification data block IDB is encoded accordingly in a block 153 by means of the encoding means 77, with the result that subsequently modulation by means of the modulation means 80 and transmission of the identification data block IDB to the station 1 take place.

Subsequently, in a block 154 the second decoding means 55 are activated, so that the second decoding means 55 are ready to decode the acknowledge data block QDB awaited from the station 1. Upon arrival of such an acknowledge data block QDB transmitted by the station 1, in a block 155 the received acknowledge data block QDB is decoded by means of the second decoding means 55. Subsequently, in a block 156 the test means 74 test whether the received acknowledge data block QDB is valid. If this is not the case, the program run is continued in block 143.

However, if the testing by means of the test means 74 in the block 156 produces a positive result, i.e. when the test means 74 output an "acknowledge valid" signal QV, via the connection 76, to the sequencing means 35, the program run is continued in a block 157 in which, using the sequencing means 35, the content of the time slot register 83, i.e. the value n, is fixed via the connection 84. This means that the time slot TS, previously selected for the data carrier 2, bearing the number n is now fixed for the data carrier 2 or for the circuit 32 of the data carrier 2, so that each time the $n^{th}$ time slot TS of successively generated time slot sequences TSS is fixed for the data carrier 2 or for the circuit 32 of the data carrier 2.

Depending on whether the content of the time slot register 82 was fixed in the block 157, the program run is continued in a block 158 in which the data carrier 2, or the circuit 32 of the data carrier 2, is set to the state "selected". This means that the data carrier 2 has the status of a data carrier which has been unambiguously identified and hence selected by the station 1 for as long as the data carrier 2 is within the communication range of the station 1.

Subsequently, in a block 159 the third decoding means 56 are activated so that they are ready to decode a read data block RDB. Subsequently, in a block 160 the fourth decoding means 57 are activated so that they are ready to decode a write data block WDB. It may occur that subsequently in a block 161 further decoding means are activated so as to be ready for the decoding of data blocks. In conformity with the block 161, for example the activation of the sixth decoding means 59 may also take place. Subsequently, in a block 162 the fifth decoding means 58 are activated so that they are ready to decode a stop data block HDB.

Subsequently, the program run involves a block 163, a block 164, a block 165 and a block 166. In the block 163 it is tested whether a read data block RDB has been decoded. In the block 164 it is tested whether a write data block WDB has been decoded. In the block 165 it is tested whether a further data block, which has not been elaborated upon, has been decoded. In the block 166 it is tested whether a stop data block HDB has been decoded. For as long as a negative test result is obtained in all four blocks 163, 164, 165 and 166, the blocks 163, 164, 165 and 166 are cyclically completed in succession.

However, if a positive test result is detected in the block 163, the program run is continued in a block 167. In the block 167 the content of the time slot counter 85 is set to the value "0". Subsequently, in a block 168 it is tested whether the content of the time slot counter 85 corresponds to the fixed content of the time slot register 83. If this is not the case, subsequently in a block 169 the content of the time slot counter 85 is incremented by the value "1", after which the program run is continued in the block 168. The blocks 168 and 169 are cyclically completed in succession for as long as the content of the time slot counter 85 deviates from the fixed content of the time slot register 83.

As soon as the content of the time slot counter 85 corresponds to the fixed content of the time slot register 83, the program run is continued in a block 170. In the block 170 the sequencing means 35 control the second storage section 38 of the storage means 36 in such a manner that overall x data blocks DB (xDB) are read from x storage cells SB (xSB) as from a storage cell SB bearing the address y (SBy), said blocks being applied to the encoding means 77 via the connection 44 and the connection 78. In a subsequent block 171, the previously read x data blocks DB (xDB) are encoded, with the result that the x data blocks DB (xDB) are transmitted to the station 1 after appropriate modulation by means of the modulation means 80.

For example, if the value n=0 is fixed in the time slot register 83 in the data carrier 2 shown in FIG. 2, the data carrier 2 will be read during the first time slot TS0 of the second time slot sequence TSS2, so that x data blocks DB are then transmitted to the station 1 in the first time slot TS0. Line 3 of FIG. 5 diagrammatically represents a read operation in which, after the station 1 has output a read data block RDB to all selected data carriers 2 present in the communication range, each time a respective data carrier 2 from among the addressed data carriers 2 is read in the time slot TS0 or TS1 or TS3 or TS4 or TS254. As is shown, a major advantage resides in the fact that the station 1 need output only a single read data block RDB for all selected data carriers 2 in order to initiate a read operation in these data carriers 2; each selected data carrier is advantageously fixed to a time slot TS and realizes a data communication with the station 1 only in the respective time slot reserved for the relevant data carrier, said data communication consisting of a read operation in the described case.

Subsequent to the block 171, the program run is continued in the block 163. When the test result in the block 163 is negative, the program run is continued in the block 164.

If the test in the block 164 reveals that a write data block WDB has been decoded by means of the fourth decoding means 57, the program run is continued in a block 172. In the block 172 the content of the time slot counter 85 is set to the value "0" again. Subsequently, in a block 173 it is tested whether the content of the time slot counter 85 corresponds to the fixed content of the time slot register 83. If this is not the case, in a block 174 the content of the time slot counter 85 is incremented by the value "1", after which the program run is continued in the block 173.

When the content of the time slot counter 85 corresponds to the fixed content of the time slot register 83, the program run is continued in a block 175. In the block 175 the identification data block IDB stored in the first storage section 37 is read and applied to the encoding means 77. Subsequently, in a block 176 the identification data block IDB is encoded by means of the encoding means 77; this results in a modulation by means of the modulation means 80 and a transmission of the identification data block IDB to the station 1.

Subsequently, in a block 177 the second decoding means 55, awaiting the arrival of the acknowledge data block QDB to be transmitted by the station 1 and awaited by the data carrier 2, are activated. After the arrival of the acknowledge data block QDB, a decoding operation is performed by means of the second decoding means 55 in a block 178, so that the acknowledge data block QDB thus decoded is applied on the one hand to the sequencing means 35 and on the other hand to the test means 74. Subsequently, in a block 179 it is tested whether the received acknowledge data block is valid. If this is not the case, the program run is continued in the block 163. However, if the test result in the block 179 is positive, the program run is continued in a block 180. In the block 180 a data block DB is written, using the sequencing means 35, into a storage cell SB bearing the address m, said data block DB having been determined from the write data block WDB decoded in conformity with the block 164. Subsequent to the block 180, the program run is continued in the block 163.

The write operation shown on the lines 4 and 5 in FIG. 5 is executed by completion of the blocks 164 and 172 to 180. This write operation is preferably initiated by a single write data block WDB output by the station 1, after which every validly acknowledged selected data carrier 2 transmits its identification data block IDB to the station 1 in the time slot TS reserved for the relevant data carrier 2, after which the station 1 returns an acknowledge data block QDB to the relevant data carrier 2. The transmission of the identification data block IDB and that of the acknowledge data block QDB take place each time in the time slot TS reserved for a data carrier 2. The actual write operation in each data carrier 2 takes place after the time slot TS reserved for the relevant data carrier 2 has elapsed; this is why the actual write operation is not shown on the lines 4 and 5 of FIG. 5.

When subsequently the test result in the blocks 163 and 164 is negative, the program run is continued in the block 165 which is representative of the testing of a further data block which is not further specified herein. After the block 165, the program run is continued in a block 181 which is representative of the execution of a further communication operation. Subsequent to the block 181 the program run is continued again in the block 163.

When subsequently the test results in the blocks 163, 164 and 165 are negative, the program run is continued in the block 166. In the block 166 it is tested whether a stop data block HDB has been decoded by means of the fifth decoding means 58. As soon as the station 1 outputs such a stop data block HDB and hence such a stop data block HDB is decoded by the fifth decoding means 58, the program run is continued in a block 182. Subsequent to the block 182, the program run is continued in the blocks 183, 184, 185, 186, 187, 188, 189 and 190. The steps corresponding to the blocks 182 to 189 are fully identical to the steps corresponding to the blocks 172 to 179, so that they will not be described again.

Whereas subsequent to the block 179 a data block DB is written into a storage cell SB in the block 180, in the block 190 the relevant data carrier 2 is set to a "stop" state. In this stop state the relevant data carrier 2, selected during a previous selection operation (see lines 1 and 2 of FIG. 5) and subsequently read during a read operation (see line 3 of FIG. 5) and subsequently written during a write operation (see lines 4 and 5 of FIG. 5) and then set to its "stop" state during a termination operation (see lines 6 and 7 of FIG. 5), no longer responds to further instructions or instruction data blocks.

The transmission of a single stop data block HDB for all selected data carriers 2 by the station 1, thus sets all validly acknowledged selected data carriers 2, each of which is fixed to a time slot TS, to their "stop" state, so that they cannot perform a further communication with the station 1.

Subsequently, the program run is continued in a block 191 in which the sequencing means 35 proceed to the block 141 after the start block 140 of the program run. As a result, an already selected data carrier 2 which was subsequently set to its stop state can participate in a data communication with the station 1 only after the data carrier 2 has first been removed from the communication range of the station 1 and subsequently brought into the communication range of the station 1 again.

The invention is not restricted to the described embodiment. In this context it is to be noted notably that it is also possible to select a different number of time slots TS for successively generated time slot sequences TSS. For example, the number of time slots TS per time slot sequence TSS can be controlled in dependence of previously determined collisions. Furthermore, the value which can be stored in a time slot register and is subsequently fixed may be chosen in a manner other than by means of a part PM of an identification data block IDB, for example by means of a random generator.

What is claimed is:
1. A data carrier (2)
   which is constructed for contactless communication with
      a station (1) which is at least suitable for reading, and
   includes receiving means (30) for receiving data blocks (DB) and transmission means (30) for transmitting data blocks (DB), and
   includes a circuit (32),
   with a receiving terminal (33) for receiving data blocks (DB) received by means of the receiving means (30), and
   with a transmission terminal (33) for outputting data blocks (DB) to be transmitted by means of the transmission means (30), and
   with time slot determination means (85) which are arranged so as to determine each time slot (TS) of successively running time slot sequences (TSS), each of which consists of a given number N of successive time slots (TS), and
   with first process means (54) which are arranged to process a selection data block (SDB) which is transmitted by a station (1) in order to initiate a selection operation and is received via the receiving terminal (33) and serves to select the data carrier (2) from a plurality of data carriers (2), and with second processing means (77) which are arranged to process, after the processing of a received selection data block (SDB) by means of the first processing means (54), an identification data block (IDB) which is stored in the circuit (32) of the data carrier (2), and can be applied, after its processing by means of the second processing means (77), during the duration of an $n^{th}$ time slot (TSn) of a time slot sequence (TSS) and via the transmission terminal (33), to the transmission means (30) for transmission to a station (1), where $1 \leq n \leq N$, and
   with third processing means (55) which are arranged to process, after correct reception in a station (1) of an identification data block (IDB) transmitted by the data carrier (2) to this station (1), an acknowledge data block (QDB) which is transmitted by this station (1) to the data carrier (2) and is received via the receiving terminal (33) and is capable of setting the circuit (32) of the data carrier (2) to a selected state, characterized in that the circuit (32) of the data carrier (2) includes time slot fixation means (83) by means of which fixation means (83), subsequent to the processing of the acknowledge data block (QDB) by means of the third processing means (55), respective the $n^{th}$ time slot (TSn) of successively running time slot sequences (TSS) can be fixed for the circuit (32) of the data carrier (2), and
   that the circuit (32) of the data carrier (2) includes control means (94) by means of which control means (94), after fixation of the circuit (32) of the data carrier (2) to the respective $n^{th}$ time slot (TSn), communication between the data carrier (2) and a station (1) can be enabled only during the respective $n^{th}$ time slot (TSn) fixed for the circuit (32) of the data carrier (2).

2. A data carrier (2) as claimed in claim 1, characterized in that the time slot fixation means (83) include a time slot register in which the number n of the $n^{th}$ time slot (TSn) fixed for the circuit (32) of the data carrier (2) can be stored.

3. A data carrier (2) as claimed in claim 2, characterized in that the time slot determination means (85) are formed by a time slot counter, and that the control means (94) include a comparator (89) which can be supplied with the content of the time slot register and the content of the time slot counter and, in the case of correspondence of the supplied contents, can enable communication between the data carrier (2) and a station (1) during the respective $n^{th}$ time slot (TSn).

4. A circuit (32) which includes the following means, a receiving terminal (33) for receiving received data blocks (DB), and a transmission terminal (33) for outputting data blocks (DB) to be transmitted, and time slot determination means (85) which are arranged so as to determine each time slot (TS) of successively running time slot sequences (TSS), each of which consists of a given number N of successive time slots (TS), and first processing means (54) which are arranged to process a selection data block (SDB) which is transmitted by a station (1), the station being at least suitable for reading, the process being in order to initiate a selection operation responsive to the selection data block that is received via the receiving terminal (33) and serves to select the circuit (32) from a plurality of circuits (32), and second processing means (77) which are arranged to process, after the processing of a received selection data block (SDB) by means of the first processing means (54), an identification data block (IDB) which is stored in the circuit (32) and can be applied, after its processing by means of the second processing means (77) and during the duration of an $n^{th}$ time slot (TSn) of a time slot sequence (TSS), to the transmission terminal (33) for transmission to a station (1), where $1 \leq n \leq N$, and third processing means (55) which are arranged to process, after correct reception in a station (1) of an identification data block (IDB) transmitted by the circuit (32) to this station 1, an acknowledge data block (QDB) which is transmitted by this station (1) to the circuit (32) and is received via the receiving terminal (33) and is capable of setting the circuit (32) to a selected state, characterized in that the circuit (32) is provided with time slot fixation means (83) by means of which fixation means (83), subsequent to the processing of the acknowledge data block (QDB) by means of the third processing means (55), respective the $n^{th}$ time slot (TSn) of successively running time slot sequences (TSS) can be fixed for the circuit (32), and that the circuit (32) includes control means (94) by means of which control means (94), after fixation of the circuit (32) to the respective $n^{th}$ time slot (TSn), communication between the circuit (32) and a station (1) can be enabled only during the respective $n^{th}$ time slot (TSn) fixed for the circuit (32).

5. A circuit (32) as claimed in claim 4, characterized in that the time slot fixation means (85) include a time slot register in which the number n of the $n^{th}$ time slot (TSn) fixed for the circuit (32) can be stored.

6. A circuit (32) as claimed in claim 5, characterized in that the time slot determination means (85) are formed by a time slot counter, and that the control means (94) include a comparator (89) which can be supplied with the content of the time slot register and the content of the time slot counter and, in the case of correspondence of the received contents, can enable communication between the circuit (32) and a station (1) during the respective $n^{th}$ time slot (TSn).

7. A readable data carrier comprising:

means for receiving data blocks;

means for transmitting data blocks;

time slot determination means for determining each time slot of at least one successively running time slot sequence, each time slot sequence comprising a given number N of successive time slots;

at least one processing means for performing at least the following operations:

responsive to a selection data block received from another station, recognizing the data carrier as being selected from amongst a plurality of data carriers responsive to the recognizing, applying an identification data block during the duration of an $n^{th}$ time slot of a time sequence via the transmission means to the other station responsive to an acknowledge data block, received from the other station in response to the identification data block setting the data carrier to a selected state;

responsive to the acknowledge data block, fixing the $n^{th}$ time slots of successively running time slot sequences for the data carrier; and controlling communication between the data carrier and the other station to occur oily during the respective $n^{th}$ time slot.

* * * * *